United States Patent
Andersson et al.

(10) Patent No.: US 6,841,615 B2
(45) Date of Patent: Jan. 11, 2005

(54) COMPOSITE ADHESIVE

(75) Inventors: Clarence A. Andersson, Wallingford, PA (US); Philip J. Roach, Townsend, DE (US)

(73) Assignee: M Cubed Technologies, Inc., Monroe, CT (US)

( * ) Notice: Subject to any disclaimer, the term of this patent is extended or adjusted under 35 U.S.C. 154(b) by 192 days.

(21) Appl. No.: 09/978,827

(22) Filed: Oct. 17, 2001

(65) Prior Publication Data

US 2002/0132887 A1 Sep. 19, 2002

(Under 37 CFR 1.47)

Related U.S. Application Data

(60) Provisional application No. 60/241,443, filed on Oct. 18, 2000.

(51) Int. Cl.$^7$ .............................. C08J 3/00; C08K 3/38; C08K 3/28; C08L 79/00; C08G 63/44
(52) U.S. Cl. ...................... 524/612; 524/401; 524/405; 524/428; 524/430; 524/437; 524/442; 528/363
(58) Field of Search ................................. 524/401, 405, 524/428, 430, 437, 442, 612; 528/363

(56) References Cited

U.S. PATENT DOCUMENTS

| | | | |
|---|---|---|---|
| 4,254,012 A | | 3/1981 | Green |
| 4,931,496 A | | 6/1990 | Qureshi et al. |
| 5,143,785 A | | 9/1992 | Pujol et al. |
| 5,330,684 A | | 7/1994 | Emori et al. |
| 5,371,178 A | * | 12/1994 | Nguyen |
| 5,863,664 A | | 1/1999 | McCormick et al. |
| 5,936,025 A | | 8/1999 | Lee et al. |
| 5,955,543 A | | 9/1999 | Sachdev et al. |
| 6,114,450 A | | 9/2000 | Sachdev et al. |
| 6,270,616 B1 | | 8/2001 | Punsly et al. |
| 6,291,071 B1 | | 9/2001 | Kuhl et al. |

FOREIGN PATENT DOCUMENTS

| | | |
|---|---|---|
| JP | 02-175148 A2 | 7/1990 |
| JP | 07-258542 A2 | 10/1995 |
| JP | 11-106481 A2 | 4/1999 |

OTHER PUBLICATIONS

Thomas W. Krucek, "A Low Cost Process for Producing Graphite Reinforced Cyanate Ester Composites for Spacecraft Thermal Management Applications", 1995 Air Force Phase I SBIR Award, Contract No. F33615–95–C–5036 (abstract only).

Product Data Sheet dated May 1999: "EX–1502–1 Paste Adhesive", Bryte Technologies, Inc., Morgan Hill, CA.

* cited by examiner

*Primary Examiner*—Patrick D. Niland
(74) *Attorney, Agent, or Firm*—Law Office of Jeffrey R. Ramberg; Jeffrey R. Ramberg

(57) ABSTRACT

A composite adhesive featuring a matrix phase that includes a cyanate ester and a filler or reinforcement phase that includes a plurality of bodies of at least one material comprising a high shear strength and/or high modulus material. Preferably, the filler also possesses at least one of high thermal conductivity and low coefficient of thermal expansion. Unlike certain commercially available cyanate esters, those of the instant invention substantially maintain or even increase in strength upon addition of the filler to the system. The instant composite adhesives may also display reduced coefficients of moisture expansion relative to the unfilled or "neat" resin. Such a composite adhesive is extremely useful for joining articles where high strength and minimal swelling in moist environments are required, such as in the precision equipment industry. In particular, the instant adhesives find great utility in joining components for semiconductor fabrication equipment, such as those that support the optics in a lithography machine.

27 Claims, 2 Drawing Sheets

COMPOSITE ADHESIVE

This patent document claims the benefit of U.S. Provisional Patent Application No. 60/241,443, filed on Oct. 18, 2000.

BACKGROUND OF THE INVENTION

1. Field of the Invention

The instant invention relates to high strength adhesives, particularly those having low coefficients of moisture expansion, such as those based on monomers or oligomers of cyanate esters. The invention furthermore relates to composite adhesives, wherein the matrix of the composite comprises the adhesive, and the filler or additive comprises one or more strong or elastically rigid materials.

2. Discussion of Related Art

For certain applications, the preferred means of fastening or joining one structure to another is by gluing or adhesive bonding. Adhesives used to bond components used in applications requiring precise motion control should be stable with respect to mechanical loads, temperature changes and changes in humidity. For mechanical stability, an adhesive should be stiff and strong. For thermal stability, an adhesive should have a low coefficient of thermal expansion (CTE) and a high thermal conductivity. For moisture stability, an adhesive should absorb as little water as possible and have a low coefficient of moisture expansion (CME).

To elaborate further on this moisture stability issue, consider, for example, a lithography machine for semiconductor fabrication featuring an optical projection mirror mounted on a cantilever beam, the end of which is adhesively bonded to a supporting structure. If one side of the adhesive joint is kept in a moisture-free environment but the other is exposed to the ambient atmosphere, it is conceivable that the side of the joint exposed to the atmosphere will absorb some water vapor and expand, whereas the side of the joint kept moisture-free will remain in its original size. This differential expansion will tend to bend the cantilever beam, which in turn will change the path of light reflected from the mirror mounted on the cantilever beam. An optics system whose light path is affected by the humidity of the ambient atmosphere is not a robust design.

The cyanate esters are a class of resins that in general have favorable moisture stability characteristics. They also possess high tensile and lap shear strengths. While epoxies generally possess adequate strength for these applications, they have higher CME's than do the cyanate esters, and also absorb greater quantities of moisture than the equivalent amount of cyanate ester.

Other properties of the adhesive resin that may be important are its coefficient of thermal expansion (CTE) and its thermal conductivity, among others. The CTE of the adhesive is important for much the same reason as described above for CME. Even if the entire adhesive joint were to heat up uniformly, the joint would expand. Typically, the CTE of adhesives is greater, often much greater, than the materials to which they are bonded. Thus, the adhesive would be expanding much more than the bonded materials for the same rise in temperature. Such differential expansions are rarely beneficial, as they often create internal stresses that can potentially lead to strains or distortions.

Similarly, the thermal conductivity of polymer adhesives typically is low, at least compared to that of the materials that it bonds, such as metals, ceramics and composites. Where thermal insulating properties are required, the neat resin (e.g., with no added filler) may perform entirely satisfactorily. Semiconductor fabrication operations such as lithography, however, generate heat that needs to be dissipated, thus requiring high thermal conductivity materials. Here the low thermal conductivity of the adhesive is a disadvantage, and it would be desirable to have an adhesive whose thermal conductivity is closer to that of the substrates bonded by the adhesive.

Japanese Laid-open Patent Application No. JP 2-175,148 to Kouichi et al. discloses an adhesive for bonding a skin layer of thermoplastic resin to a core material. The adhesive may be a curing type system such as epoxy, urethane or acrylic, or a hot melt system such as ethylene-vinyl acetate, polyester or polyamide. A filler is added to the adhesive to reduce the thermal expansion coefficient. Candidate filler materials include inorganic salts such as calcium carbonate or calcium sulfate, pulverized metals such as aluminum or iron, ceramic such as silicon carbide or silicon nitride, short fibers such as glass or carbon, or woodmeal or resin powder.

U.S. Pat. No. 5,844,309 to Yukio et al. discloses an adhesive composition particularly useful in bonding a semiconductor device to a substrate. A filler material having a specific particle size distribution is incorporated into the resin component of the adhesive, thereby rendering the adhesive capable of completely filling hollows and gaps during thermal pressing of the semiconductor device to the substrate. The thermal conductivity of the adhesive may be enhanced by using fillers having excellent thermal conductivity, such as aluminum oxide, aluminum nitride, silicon nitride, silicon carbide, crystalline silica, fused silica and so forth. Where electrical conductivity is required, silver powder is used as the filler. Neither Yukio nor Kouichi discloses the low CME cyanate esters of the instant invention. Further, "excellent" is a relative term in that while the fillers may be much more thermally conductive than the adhesive, some on the list, fused silica for example, are poor thermal conductors compared to some of their ceramic peers, such as aluminum nitride.

Japanese Laid-open Patent Application No. JP 11-106,481 to Masahiro et al. and entitled "Underfill Material for Liquid Injection Sealing" also discloses an adhesive composition useful for semiconductor bonding. The composition includes a spherical inorganic filler having an average particle size of about 0.5–12 micrometers, with all particles smaller than 70 micrometers. The resin matrix includes an epoxy resin, a cyanate ester and a bisphenol compound.

Japanese Laid-open Patent Application No. JP 7-258,542 to Akio discloses a resin composition based upon a cyanate ester that is more resistant against separation of admixed microballoons during curing of the resin. Curing yields a homogeneous, lightweight material. The data sheet for what appears to be a related product refers to its composition as a syntactic foam. (BryteCor® EX-1541 Syntactic Foam, Bryte Technologies, Inc., Morgan Hill, Calif.). Typical applications of this syntactic foam include foam cores for space structures and net molded foam parts, e.g., for making tooling.

U.S. Pat. No. 4,931,496 to Qureshi et al. discloses a tough, damage tolerant fiber-reinforced composite based upon a cyanate ester resin formulation. The reinforcing fiber is a structural fiber such as glass.

U.S. Pat. No. 5,955,543 to Sachdev discloses an adhesive for bonding a die of an integrated circuit, the adhesive comprising an aryl cyanate ester resin and an additive that is a functionalized oligomeric/polymeric phenolic resin. The adhesive optionally may contain an electrically or thermally conductive filler. The electrically conductive filler is preferably a highly conductive metal such as silver, gold, copper or nickel, and preferably is in the form of flakes. The thermally conductive fillers can be AlN, $SiO_2$, SiC, BN, the like, and mixtures thereof. The weight ratio of the resin/additive mixture to filler is preferably in the range of about 15:85 to about 50:50.

The prior art, as represented by the above-mentioned patent disclosures, suffers from a variety of shortcomings. As can be seen, many of the disclosures pertain to bonding integrated circuits ("dies") to substrates, and many of these applications are for hermetic environments. Thus, expansion due to moisture absorption would not be as problematic compared to the product applications facing the instant inventors, where the adhesive joint will be exposed to moist environments, or even more challenging, where one side of the joint will be exposed to the moist environment. Thus, while some of these patents disclose low CTE fillers for a resin matrix, the matrix is not the low CME cyanate ester resin of the instant invention. Others disclose electrically or thermally conductive fillers for a cyanate ester resin system, but are silent on the issue of the resulting strength of the filled cyanate ester adhesive system. Perhaps in these patents, the strength of the joint is not critical because the component being bonded is relatively small and lightweight. In contrast, the instant inventors need a resin system for bonding large, heavy structures. Thus, the strength of the bond is important. At the same time, many of the above-mentioned properties are also desirable, such as high thermal conductivity. There are commercially available cyanate ester prepreg systems containing highly conductive structural reinforcement such as graphite fibers. There is also at least one commercially available cyanate ester based adhesive system containing thermally conductive boron nitride. Unfortunately, this composite adhesive system has a lap shear strength of only about 1000 psi (6.9 MPa) versus about 6000 psi (41 MPa) for the cyanate ester adhesive without such boron nitride filler.

In short, the prior art addresses some, but not all, of the issues confronting the instant inventors.

Thus, it is an object of the instant invention to produce a cyanate ester based adhesive featuring an additive filler that, upon curing, maintains at least a significant fraction of the tensile and shear strength of the neat cyanate ester.

It is an object of the instant invention to produce a high strength cyanate ester based composite adhesive that, upon curing, absorbs even less moisture than the neat cyanate ester.

It is an object of the instant invention to produce a high strength cyanate ester based composite adhesive that, upon curing, has a higher elastic modulus than the neat cyanate ester.

It is an object of the instant invention to produce a high strength cyanate ester based composite adhesive that, upon curing, has a higher thermal conductivity than the neat cyanate ester.

It is an object of the instant invention to produce a high strength cyanate ester based composite adhesive that, upon curing, has a lower CTE than the neat cyanate ester.

SUMMARY OF THE INVENTION

Accordingly, these and other desirable features of the instant invention are realized by incorporating a physically strong and/or stiff filler material into the neat resin, thereby producing a "composite" cyanate ester based adhesive. Preferably, the filler also possesses a low CTE and/or high thermal conductivity, at least in comparison to the corresponding properties of the cured neat resin. Such candidate filler materials include silicon carbide and aluminum nitride. These filler materials typically are provided as finely divided, discontinuous bodies, and are easily admixed with the cyanate ester based resin system to produce a composite adhesive. Unlike the commercially available BN filled cyanate ester resin, it was surprisingly discovered that the strength of the composite adhesive of the instant invention usually was greater than that of the neat resin. Moreover, composite cyanate ester adhesives containing the preferred fillers exhibit even lower coefficient of moisture expansion (CME) values than the already relatively low CME's for the neat resin.

DETAILED DESCRIPTION OF THE INVENTION AND PREFERRED EMBODIMENTS

Figure 1:
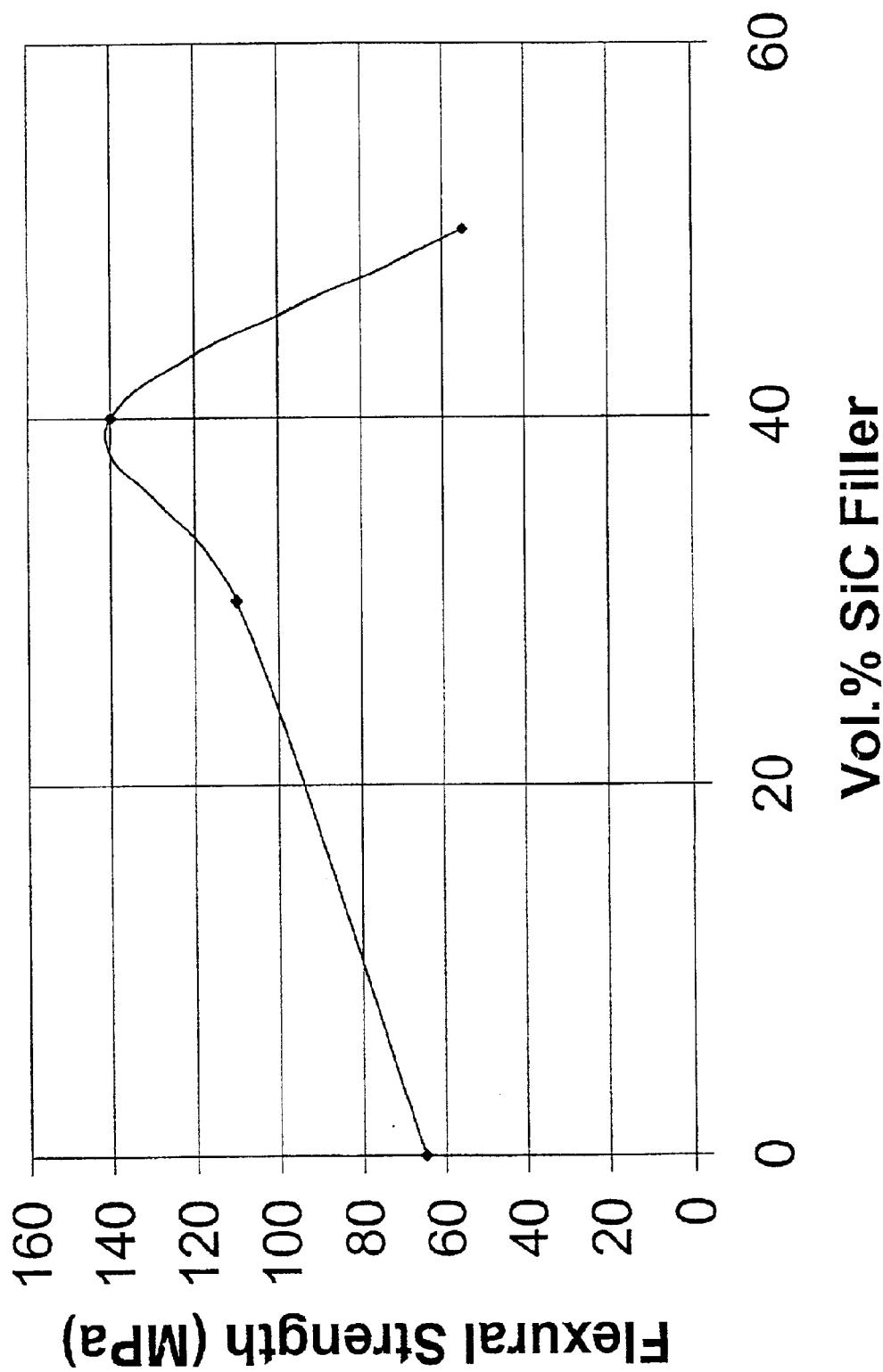
FIG. 1 is a graph showing the strength of the composite adhesive in flexure mode as a function of SiC filler loading.

The instant invention comprises a cyanate ester resin system having incorporated in it as a property-modifying agent one or more filler materials of high strength and/or high elastic modulus, thereby producing a "composite" cyanate ester based adhesive. Such composite adhesives exhibit dramatically improved tensile strength compared to their unreinforced counterparts. Preferably, the filler also possesses a low CTE and/or high thermal conductivity. By the terms "high" and "low", what is meant is that the CTE and thermal conductivity exhibited by the filler is higher or lower than the corresponding property exhibited by the neat cyanate ester based adhesive in the cured condition.

As mentioned above, a boron nitride (BN) reinforced cyanate ester system is commercially available because many customers want the enhanced thermal conductivity provided by the BN, but also want a low electrical conductivity not provided by metallic fillers. However, the presence of the BN drastically reduces the bond strength of the adhesive in the cured condition. The instant inventors were pleasantly surprised to discover that this strength reduction effect is not universal, but instead is filler-specific. In fact, some fillers such as SiC particulate actually increased the tensile strength of the composite adhesive, and dramatically so under the right conditions. As will be discussed in more detail below, at least when the filler consisted of this SiC particulate, however, there was a limit to the strength-enhancing effect with increasing concentration, or volumetric loading, of the SiC filler. At a loading of about 40 volume percent SiC, for instance, the flexural strength of the bond of the cured composite adhesive was more than double that of the neat resin in the same cured condition. The strength dropped quickly, however, with further SiC additions. At a loading of about 50 volume percent, for instance, the strength had dropped to below that of the neat (i.e., unreinforced) cyanate ester adhesive.

Without wishing to be bound to any particular theory or explanation, it may be that certain fillers such as silicon carbide have elastic moduli (e.g., Young's modulus and shear modulus) sufficiently large as to act to constrain the matrix during mechanical loading of the cured composite adhesive. Accordingly, such fillers may be able to effectively transfer some of the applied load from the resin matrix to the filler. In contrast, other fillers, particularly those having the graphite crystal structure, such as boron nitride, are weakly bonded in one or more crystallographic directions, and therefore are easily distorted in these directions under stress. In other words, in the elastic region, such materials would have a low elastic constant in one or more crystallographic directions. Similarly, in the plastic region, they would yield at a low stress level. In a composite adhesive body, such compliant or low-strength filler materials might act as a void, thereby forcing the matrix to carry the entire applied load. Under these conditions, then, the yield and fracture strength of the composite adhesive might be expected to vary in some proportion to the volume fraction of resin matrix, in other words, in inverse proportion to the filler loading. Certain soft metals often used to make electrically conductive resin compositions, such as silver, gold, aluminum and copper, might also be expected to exhibit similar deleterious mechanical behavior in composite adhesive systems.

The candidate fillers of the instant invention generally are the metal- or ceramic-containing materials. Usually, such materials will inherently possess lower CTE and higher thermal conductivity than does the cured matrix. Appropriate fillers then, can and should first be selected or screened based on their effect on the tensile or shear strength of the composite adhesive. Again, the use of weak, soft or friable ceramics such as graphite, hexagonal boron nitride, talc, etc. typically is counterproductive to the objectives of the instant invention. Similarly, soft metals, including unalloyed silver, aluminum, gold or copper are not desirable. Rather, molybdenum or hardened steel, for instance, should be suitable. Generally speaking, elastically stiff, strong, intrinsically hard or hardenable metals, such as for example, through alloying and/or heat treatment, should be useful as fillers. Among ceramic materials, there are many strong or hard ceramics from which to choose, including oxides such as aluminum oxide or zirconium oxide, borides such as titanium diboride or silicon tetraboride, carbides such as silicon carbide or boron carbide, and nitrides such as aluminum nitride or silicon nitride.

These filler materials typically are provided as finely divided, discontinuous bodies. The morphology or shape of the bodies is not particularly critical, although for reasons of economy and commercial availability, particulate is a popular choice. Discrete, discontinuous bodies of filler are preferred because it is anticipated that the most common method for preparing the instant composite adhesives will be to stir or blend the filler into the adhesive matrix. Accordingly, while the inventors anticipate that users may want to mix in any required catalysts into the resin prior to adding filler, the resulting adhesive still should have a viscosity that is not so high as to thwart the mixing in of the filler. The instant inventors have found that a cyanate ester adhesive having a paste consistency works entirely satisfactorily. Conversely, exceptionally low viscosities could be problematical because the added fillers may tend to settle out too quickly, but such concerns may be largely academic. Specifically, one can usually tailor viscosity (e.g., raise or lower) as needed through controlled crosslinking of the resin and/or through temperature adjustment.

Further, because the filler contemplated by the instant invention mostly comprise the metal- or ceramic-containing materials, and in general, nonporous ones at that, the filler phase usually does not absorb moisture upon exposure to damp environments. Accordingly, the composite adhesive will absorb less water than the same volume of unfilled adhesive. Still farther, due to the mechanical constraining effect of the filler, the composite adhesive typically will exhibit a lower CME than the unfilled adhesive.

The following example further illustrates the instant invention.

EXAMPLE

Various volumetric loadings of SiC in a cyanate ester resin were prepared. Specifically, the resin and catalyst components of EX-1502-1 cyanate ester paste adhesive (Bryte Technologies, Inc., Morgan Hill, Calif.) were placed into a beaker in accordance with the manufacturer's recommended proportions and heated to a temperature of about 120° F.–150° F. (49° C.–71° C.) to reduce their viscosity for improved mixing. At this temperature, the two components were thoroughly stirred together. Then, premeasured amounts of Grade 500 RG SIKA green silicon carbide particulate (Norton-St. Gobain, Worchester, Mass.) having an average particle size of about 12 micrometers and preheated to a temperature of about 120° F.–150° F. (49° C.–71° C.) were hand-stirred into the warmed, homogeneous adhesive to produce a composite adhesive.

Pairs of rectangular prisms of Grade HSC-701 aluminum-toughened silicon carbide ceramic (M Cubed Technologies, Inc., Monroe, Conn.) were bonded at their ends using this composite adhesive, and then strength tested in flexure. More specifically, the ends to be joined were prepared for resin bonding by first "sandblasting" these surfaces with abrasive grit. Both the adhesive and the prisms of ceramic material were then preheated to a temperature of about 120° F.–150° F. (49° C.–71° C.). At this temperature, the composite adhesive was applied to the joint, and the joined pair was fixtured to prevent movement during curing. Further heating to a temperature of about 250° F. (121° C.) for about 5 to 16 hours was sufficient to cure the adhesive. The flexural strength testing was then performed according to ASTM Procedure No. D790. The results are presented both in the table below as well as in FIG. 1. As can be seen, the strength of the composite adhesive 40 percent loaded in SiC was about twice that of the adhesive containing no SiC.

The ambient temperature Young's Modulus was measured for the 40 volume percent SiC loaded cyanate ester adhesive using a Sintech mechanical tester (Systems Integration Technology Inc., Stoughton, Mass.); it was found to be about 3.9 GPa.

Figure 2:
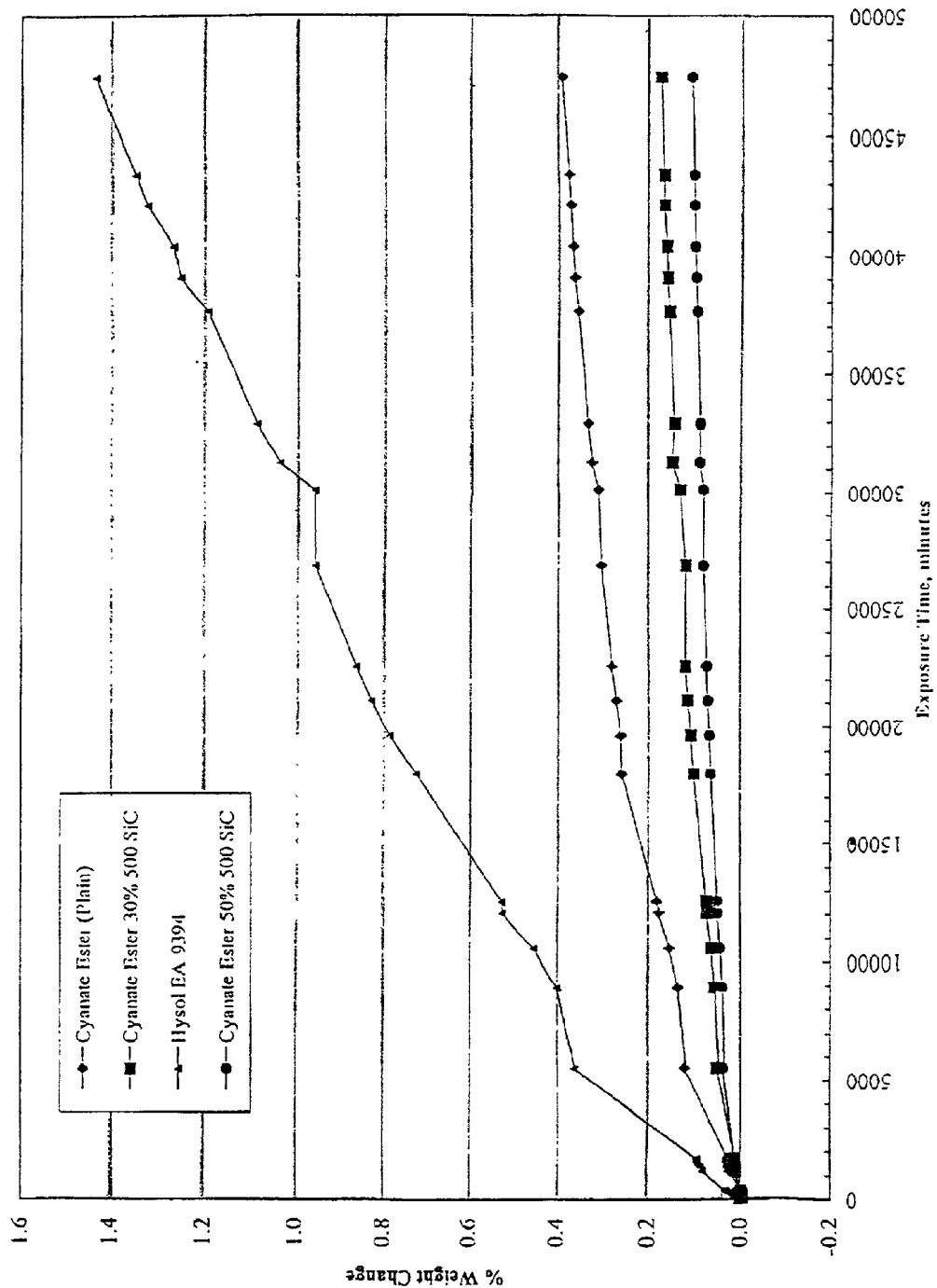
FIG. 2 is a graph of weight increase as a function of time for various composite adhesive compositions, indicating moisture absorption.

Further, gravimetric analysis was performed to indicate the amount of water absorbed by the composite adhesive sample. Specifically, bodies of cured composite resin corresponding to the various SiC loadings were prepared by casting the composite adhesive into discs measuring about 80 millimeters in diameter by about 3 millimeters thick. The discs of cured composite adhesive were then placed into a chamber flushed with 98 percent humid nitrogen gas. This particular atmosphere was prepared by bubbling commercially pure nitrogen gas through a water bath maintained at a temperature of about 80° C. The relative humidity was measured with a hydrometer. The samples were removed, typically on a daily basis, weighed, and returned to the approximately 20° C. chamber. The results are reported in the table below, specifically at the 21-day mark. The complete water absorption data are also displayed graphically in FIG. 2, along with the data obtained on a commercially available aluminum filled epoxy system (Hysol EA 9394, Dexter Adhesive and Coating Systems, Bay Point, Calif.) typically used for bonding aerospace structures.

| Vol % SiC Filler | Flexural Strength (MPa) | 21 day Water Absorption (Wt %) |
| --- | --- | --- |
| 0 | 65 | 0.32 |
| 30 | 110 | 0.14 |
| 40 | 140 | — |
| 50 | 55 | 0.09 |

Still further, the coefficient of moisture expansion (CME) was measured in the "as-cured" condition at ambient temperature (e.g., about 20° C.) for the samples of cured adhesive containing zero and 30 volume percent SiC. The CME is a measure of the fractional length change of the body per unit change in moisture content. Specifically, the above-described humidity chamber was placed into the length-measuring stage of a Mettler TMA-40 thermo-mechanical analyzer (Mettler-Toledo GmbH, Greifensee, Switzerland). A specimen measuring about 4 millimeters square by about 16 millimeters long was inserted into the thermo-mechanical analyzer lengthwise. Approximately daily, the length and mass of the specimen was measured and recorded. The mass increase was used as a measure of moisture absorption. At the 21-day mark, a CME was computed based on the total length and mass increases. The CME of the 30 volume percent SiC filled resin was about 400 ppm linear expansion per weight percent moisture absorbed, which value is about one-third that of the neat resin.

Thus, the above example shows that incorporation of some SiC particulate into a cyanate ester adhesive increases strength, reduces moisture absorption and reduces CME. Although the flexural strength of the composite adhesive that was 50 percent loaded in SiC was only about 85 percent that of the neat resin, such a formulation still may have utility due to enhancement of other properties, e.g., reduced water absorption.

The composite adhesive containing 30 volume percent SiC particulate was further characterized with respect to it sound propagating properties in the "as cured" condition. Specifically, the velocity of sound waves propagating through the filled cyanate ester composite body was measured using the pulse echo technique of ASTM Standard D 2485 to determine the Poisson's ration and elastic modulus ("sonic modulus"). Using the water immersion technique of ASTM Standard B 311, the bulk density of the body was found to be about 1631 kg/m$^3$. From this density and the sound wave velocities, the Poisson's ratio was calculated to be about 0.31 and the elastic modulus was computed as being about 8 GPa.

The EX 1502-1 cyanate ester (Bryte Technologies, Inc.) of the above example was selected because it exhibited viscosity characteristics at room temperature that were sought by the instant inventors, e.g., it had a paste consistency. Other cyanate esters having somewhat different viscosities should also be useable in accordance with the instant invention.

Further on this point, not only may composite cyanate ester adhesives be prepared in bulk form, it should be possible also to prepare the composite adhesive in sheet form. Specifically, one or more mechanically strong and/or stiff fillers can be admixed into a cyanate ester adhesive. As in the above example, it may be necessary to heat at least the adhesive somewhat to place the adhesive in a workable condition, e.g., to reduce viscosity. Before the composite adhesive crosslinks excessively, it is spread into sheet form onto a film featuring a release coating. Another approach is to dissolve the cyanate ester adhesive in a solvent such as tetrahydrofuran, add the filler(s) to the solution, spread this mixture onto the release film such as by a doctor blade technique, and remove the solvent by drying. A thickness of adhesive of only a few thousandths of an inch, e.g., about 5 thousandths (about 130 microns) has been found to be entirely satisfactory. The composite sheet adhesive is then stored until it is ready to be used, preferably in contact with a covering release film and preferably at a temperature at which little or no crosslinking occurs. If the release film has release properties on both sides, the composite sheet adhesive can be stored simply by rolling the sheet on itself like a roll of wrapping paper.

Thus, the instant inventors have discovered that it is possible to tailor or engineer, among other parameters, the thermal, elastic and expansion properties of the cyanate ester resin system through addition of the right filler. Not only may the above-mentioned properties be achieved without sacrificing the strength of the cured resin, but the strength can actually be increased, and to a substantial degree. At least when the filler is SiC, though, the composite adhesive should not be made excessively loaded in the SiC filler. Thus, it may be necessary to choose the filler and the volumetric loading of that filler judiciously when preparing composite adhesives where strength is an important parameter.

Further, because the composite adhesive system possesses a tailorable viscosity, it should be possible to form or mold bulk structures of the composite adhesive by known techniques to make self-supporting structures of desired size and shape, e.g., using the adhesive compositions to fabricate shaped articles as opposed to joining other structures to one another.

The preceding example is by no means exhaustive. Accordingly, the instant invention should in no way be construed as being limited to the example. In fact, those skilled in the art will readily appreciate that numerous modifications can be made to the invention as described without departing from the scope of what is sought to be protected, which is what is recited in the appended claims.

INDUSTRIAL APPLICABILITY

The methods and compositions of the instant invention find utility in applications in which an adhesive bond is required to possess high strength and low coefficient of moisture expansion. Accordingly, the composite adhesives of the instant invention should be of interest to the precision equipment, robotics, tooling, electronic packaging, and semiconductor fabrication industries, among others. Specific applications contemplated by the instant invention include bonding semiconductor chips to substrates, and bonding structural components of semiconductor lithography machines, such as in the bench, bridge and housing structures for supporting the optics.

What is claimed is:
1. A composite adhesive, comprising:
  (a) a matrix phase comprising a cyanate ester; and
  (b) a filler or reinforcement phase comprising a plurality of bodies of at least one material comprising at least one property selected from the group consisting of high elastic modulus, high strength and high hardness, said bodies making up no more than 40 percent by volume of said composite adhesive; and wherein said composite adhesive is free of weak, soft or friable metals and ceramics.

2. The composite adhesive of claim 1, wherein said filler comprises silicon carbide.

3. A method for making a composite adhesive, comprising:
  (a) providing at least one filler material comprising a plurality of physically stiff or strong discontinuous bodies;
  (b) providing a resin comprising at least one cyanate ester;
  (c) dispersing said bodies into said resin to produce an admixture that is no more than 40% by volume loaded with said bodies; and
  (d) avoiding the introduction into said admixture of soft, weak or friable metals or ceramics.

4. The method of claim 3, wherein prior to said dispersing, the viscosity of said resin is adjusted to promote good mixing of said bodies with said resin.

5. The method of claim 4, wherein said viscosity is raised by crosslinking at least a portion of said resin.

6. The method of claim 4, wherein said viscosity is adjusted by adjusting the temperature of said resin.

7. The method of claim 3, wherein said physically stiff bodies comprise bodies of at least one of high elastic modulus, high shear strength and high hardness.

8. The composite adhesive of claim 1, wherein in a cured condition, said composite adhesive has a lower coefficient of moisture expansion than does a similarly cured cyanate ester having substantially the same chemical composition as said cyanate ester of said matrix.

9. The composite adhesive of claim 1, wherein in a cured condition, said composite adhesive possess a higher flexural strength than does said cyanate ester of said matrix without said filler.

10. The composite adhesive of claim 1, wherein said filler is present in said adhesive in an amount that is no greater than about 30 percent by volume.

11. The composite adhesive of claim 1, wherein said filler comprises a material selected from the group consisting of boron carbide, silicon nitride, aluminum nitride and aluminum oxide.

12. The composite adhesive of claim 1, wherein said filler comprises a material selected from the group consisting of oxides, carbides, borides and nitrides.

13. The composite adhesive of claim 1, wherein said filler comprises a morphology selected from the group consisting of particulate, platelets and discontinuous fibers.

14. The method of claim 3, wherein said filler is present in said adhesive in an amount that is no greater than about 30 percent by volume.

15. The method of claim 3, wherein said filler comprises a material selected from the group consisting of silicon carbide and aluminum nitride.

16. The method of claim 3, wherein said filler comprises a material selected from the group consisting of oxides, carbides, borides and nitrides.

17. The method of claim 3, wherein said filler comprises a morphology selected from the group consisting of particulate, platelets and discontinuous fibers.

18. A composite adhesive, comprising:
  (a) a matrix phase comprising a cyanate ester; and
  (b) a filler or reinforcement phase comprising a plurality of bodies of at least one material comprising at least one property selected from the group consisting of high elastic modulus, high strength and high hardness, said bodies making up no more than about 30 percent by volume of said composite adhesive; and wherein said composite adhesive does not contain soft, weak or friable materials selected from the group consisting of metals and ceramics.

19. The composite adhesive of claim 18, in a substantially cured condition.

20. The composite adhesive of claim 18, in a substantially uncured condition.

21. The composite adhesive of claim 18, further being provided in the form of a sheet or film.

22. The composite adhesive of claim 18, further being provided in bulk form.

23. An adhesive system comprising the composite adhesive of claim 18 disposed as a layer on at least one face of a release film.

24. The composite adhesive of claim 18, wherein said filler comprises a material selected from the group consisting of silicon carbide and aluminum nitride.

25. The composite adhesive of claim 18, wherein said filler comprises a material selected from the group consisting of boron carbide, silicon nitride and aluminum oxide.

26. The composite adhesive of claim 18, wherein said filler comprises a material selected from the group consisting of oxides, carbides, borides and nitrides.

27. The composite adhesive of claim 18, wherein said filler comprises a morphology selected from the group consisting of particulate, platelets and discontinuous fibers.

* * * * *